(12) United States Patent
Kruempel et al.

(10) Patent No.: US 11,104,036 B2
(45) Date of Patent: *Aug. 31, 2021

(54) PROCESS FOR PREPARING A POLYOLEFIN COMPOSITION

(71) Applicant: Basell Polyolefine GmbH, Wesseling (DE)

(72) Inventors: Peter Kruempel, Bad Camberg (DE); Harald Prang, Erftstadt (DE); Reinhard Kuehl, Bornheim (DE); Elke Damm, Bad Vilbel (DE)

(73) Assignee: Basell Polyolefine GmbH, Wesseling (DE)

( * ) Notice: Subject to any disclaimer, the term of this patent is extended or adjusted under 35 U.S.C. 154(b) by 350 days.

This patent is subject to a terminal disclaimer.

(21) Appl. No.: 16/423,829

(22) Filed: May 28, 2019

(65) Prior Publication Data

US 2019/0337190 A1 Nov. 7, 2019

Related U.S. Application Data

(63) Continuation of application No. 15/532,274, filed as application No. PCT/EP2015/078470 on Dec. 3, 2015, now abandoned.

(30) Foreign Application Priority Data

Dec. 4, 2014 (EP) .................................. 14196371

(51) Int. Cl.
*B29B 7/42* (2006.01)
*B29B 7/72* (2006.01)
(Continued)

(52) U.S. Cl.
CPC .............. *B29B 7/728* (2013.01); *B29B 7/005* (2013.01); *B29B 7/007* (2013.01); *B29B 7/42* (2013.01);
(Continued)

(58) Field of Classification Search
CPC .......... B29B 7/42; B29B 7/603; B29C 48/286
See application file for complete search history.

(56) References Cited

U.S. PATENT DOCUMENTS

| 3,638,916 A | 2/1972 | Ursic et al. |
| 4,237,082 A | 12/1980 | LaSpisa et al. |

(Continued)

FOREIGN PATENT DOCUMENTS

| CH | 384849 A | 2/1965 |
| CN | 1178807 A | 4/1998 |

(Continued)

OTHER PUBLICATIONS

The International Preliminary Report on Patentability for PCT/EP2015/078473 dated Jun. 15, 2017.

(Continued)

*Primary Examiner* — James Sanders

(57) ABSTRACT

A process for continuously preparing a polyolefin composition made from or containing a polyolefin and carbon black in an extruder device. The process includes the steps of supplying polyolefin in form of a polyolefin powder and carbon black to a mixing device; alternatively, (a) measuring the flow rate of the polyolefin powder supplied to the mixing device or (b) measuring the flow rate of the polyolefin pellets prepared in the extruder device; adjusting the flow rate of the carbon black to the mixing device in response to the measured flow rate of the polyolefin powder or adjusting the flow rate of the polyolefin powder to the mixing device in response to the measured flow rate of the polyolefin pellets; melting and homogenizing the mixture within the extruder device; and pelletizing the polyolefin composition into the polyolefin pellets.

19 Claims, 1 Drawing Sheet

(51) Int. Cl.

| | | |
|---|---|---|
| *B29C 48/04* | (2019.01) | |
| *B29C 48/00* | (2019.01) | |
| *B29C 48/92* | (2019.01) | |
| *B29C 48/285* | (2019.01) | |
| *C08J 3/20* | (2006.01) | |
| *B29B 9/06* | (2006.01) | |
| *G05D 11/13* | (2006.01) | |
| *B29B 7/60* | (2006.01) | |
| *B29B 7/00* | (2006.01) | |
| *B29B 7/48* | (2006.01) | |
| *B29B 7/88* | (2006.01) | |
| *C08J 3/22* | (2006.01) | |
| *C08K 3/04* | (2006.01) | |
| *B29B 7/90* | (2006.01) | |
| *B29B 9/12* | (2006.01) | |
| *B29C 48/03* | (2019.01) | |
| *B29B 7/38* | (2006.01) | |
| *B29K 23/00* | (2006.01) | |
| *B29K 105/16* | (2006.01) | |
| *B29K 507/04* | (2006.01) | |

(52) U.S. Cl.
CPC ............... *B29B 7/48* (2013.01); *B29B 7/603* (2013.01); *B29B 7/88* (2013.01); *B29B 7/90* (2013.01); *B29B 9/065* (2013.01); *B29B 9/12* (2013.01); *B29C 48/022* (2019.02); *B29C 48/04* (2019.02); *B29C 48/286* (2019.02); *B29C 48/288* (2019.02); *B29C 48/298* (2019.02); *B29C 48/92* (2019.02); *C08J 3/203* (2013.01); *C08J 3/22* (2013.01); *C08K 3/04* (2013.01); *G05D 11/132* (2013.01); *B29B 7/38* (2013.01); *B29B 9/06* (2013.01); *B29C 48/03* (2019.02); *B29C 2948/926* (2019.02); *B29C 2948/92104* (2019.02); *B29C 2948/92828* (2019.02); *B29K 2023/06* (2013.01); *B29K 2023/065* (2013.01); *B29K 2105/16* (2013.01); *B29K 2507/04* (2013.01); *C08J 2323/06* (2013.01); *C08J 2323/08* (2013.01)

(56) References Cited

U.S. PATENT DOCUMENTS

| | | | |
|---|---|---|---|
| 4,448,736 | A | 5/1984 | Emery et al. |
| 4,510,271 | A | 4/1985 | Muhle et al. |
| 4,684,488 | A | 8/1987 | Rudolph |
| 5,314,579 | A | 5/1994 | Sung |
| 6,254,374 | B1 | 7/2001 | Hatfield |
| 6,492,485 | B1 | 12/2002 | Gohr et al. |
| 8,399,543 | B2 | 3/2013 | Dewachter |
| 8,543,242 | B2 | 9/2013 | Odi |
| 2003/0096901 | A1 | 5/2003 | Aarila et al. |
| 2004/0020272 | A1 | 2/2004 | Lin et al. |
| 2006/0063896 | A1 | 3/2006 | McElvain et al. |
| 2006/0287442 | A1 | 12/2006 | McElvain et al. |
| 2009/0022007 | A1 | 1/2009 | Massarotto |
| 2011/0015331 | A1 | 1/2011 | Dewachter |
| 2011/0120498 | A1 | 5/2011 | Samaras |
| 2011/0124545 | A1 | 5/2011 | Mort, III et al. |
| 2013/0099424 | A1 | 4/2013 | Rohatgi et al. |
| 2017/0002187 | A1 | 1/2017 | Tynys et al. |

FOREIGN PATENT DOCUMENTS

| | | | |
|---|---|---|---|
| CN | 1388202 | A | 1/2003 |
| CN | 102993556 | A | 3/2013 |
| DE | 2751225 | A1 | 5/1979 |
| DE | 10230321 | A1 | 1/2004 |
| EP | 238796 | A2 | 9/1987 |
| EP | 882571 | A1 | 12/1998 |
| EP | 2016995 | A1 | 1/2009 |
| EP | 2030757 | A1 | 3/2009 |
| EP | 2873685 | A1 | 5/2015 |
| JP | S49099138 | A | 9/1974 |
| JP | H05309647 | A | 11/1993 |
| JP | 2002-273201 | A | 9/2002 |
| JP | 2003345062 | A | 12/2003 |
| KR | 10-1162516 | B1 | 7/2012 |
| RU | 2115665 | C1 | 7/1998 |
| RU | 2235742 | C2 | 9/2004 |
| SU | 1785908 | A1 | 1/1993 |
| WO | 0035646 | A1 | 6/2000 |
| WO | 2004004996 | A1 | 1/2004 |
| WO | 2005068516 | A2 | 7/2005 |
| WO | 2009059967 | A2 | 5/2009 |
| WO | 2011058861 | A1 | 5/2011 |
| WO | 2011101438 | A1 | 8/2011 |

OTHER PUBLICATIONS

The International Search Report and Written Opinion for PCT/EP2015/078470 dated Mar. 14, 2016.
Rubber Industry Manual, vol. 10, Plant Design, editted by Tu Yuxian, pp. 299-302, Chemical Industry Press, Beijing, Jun. 1995.
Letter from Coperion K-Tron (Schweiz) GmbH dated Dec. 19, 2018.
K-Tron Soder Smart Feeding Solution, Application Example, Polyolefins/Bulk Polymer Compounding, 08.29/5510-en, Sep. 2001, 4 pages.
K-Tron Process Group, Application Example, Feedings & Conveying in Polyolefin Production, 2010 K-Tron International, Inc. A-800101-EN (0290000451) Feb. 2010, 12 pages.
Coperion K-Tron, Application Example, Feeding & Conveying in Polyolefin Production, 2010 K-Tron Technologies, Inc., A-800101-en (0290000451), Feb. 2014, pp. 1-12, XP055548544.
Optimising Feeding and Conveying During Polyolefin Production, Success Depends on the Components, https://cpp.industrie.de/plant-processing/success-depends-on-the-components/, Mar. 29, 2011.
K-Tron Feeders, K-Tron Product Specification Smart Flow Meter K-SFM-350, Rev, Nov. 2009, pp. 1-2, XP055548542.
Tolinski, Additives for Polyolefins, William Andrew, Oxford, UK, ISBN:978-0-81-552051-1, 2009, pp. 139-141, 148-150, and 237-239.
Perry et al., Perry's Chemical Engineers' Handbook, 6th edition, McGraw-Hill, Inc., 1984, pp. 21-5 to 21-7.
Paul et al., Handbook of Industrial Mixing Science and Practice, A John Wiley & Sons, Inc. Publication, 2004, pp. 940, 943 and 944.
Smith et al., Valve Selection Handbook, 5th edition, Engineering Fundamentals for Selecting the Right Valve Design for Every Industrial Flow Application, Elsevier Inc., 2004, pp. 137-142.

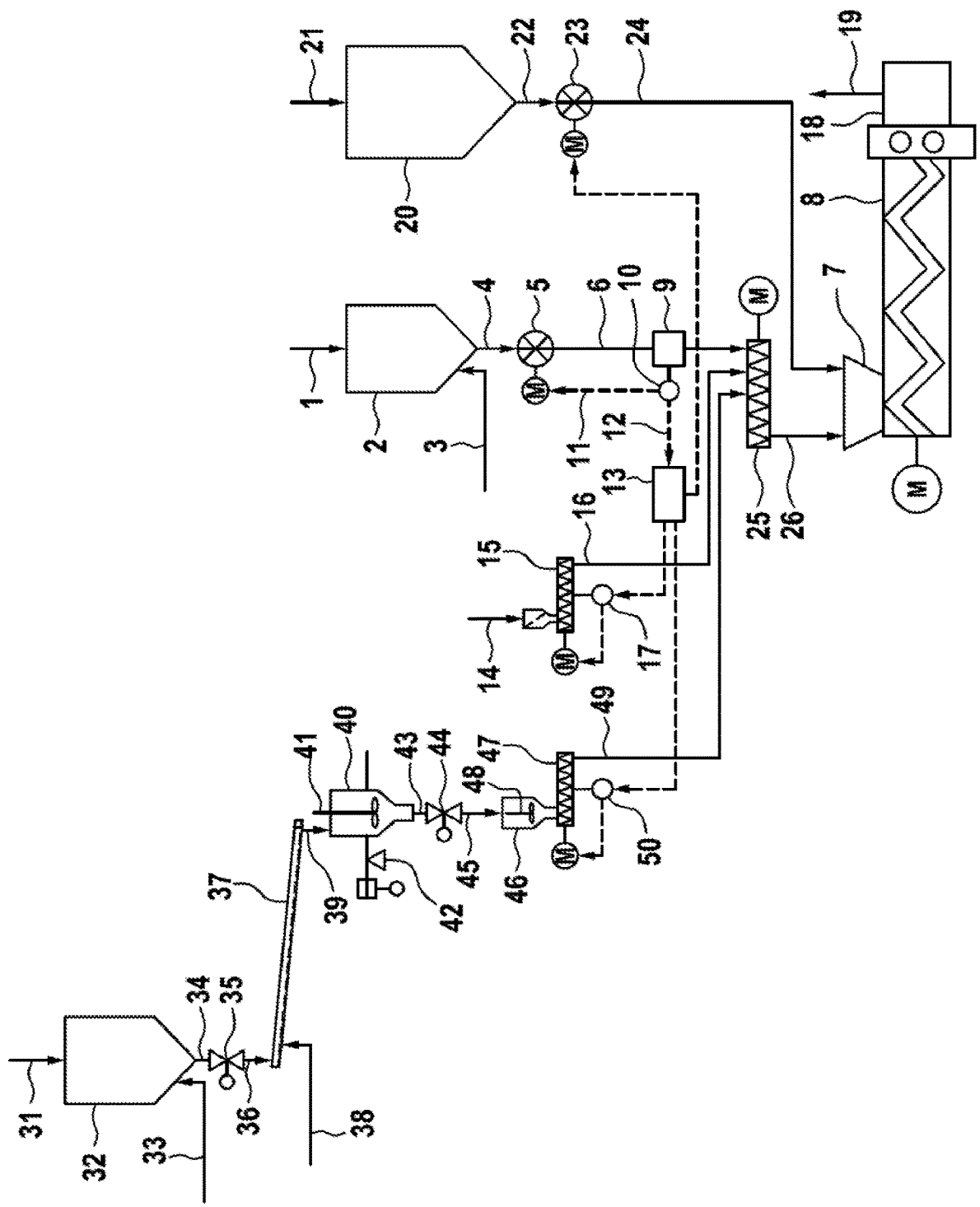

PROCESS FOR PREPARING A POLYOLEFIN COMPOSITION

CROSS-REFERENCE TO RELATED APPLICATIONS

This application is a divisional application of co-pending U.S. patent application Ser. No. 15/532,274, filed Jun. 1, 2017, which is the U.S. National Phase of PCT International Application PCT/EP2015/078470, filed Dec. 3, 2015, claiming the benefit of priority to European Patent Application No. 14196371.0, filed Dec. 4, 2014, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure provides a process for continuously preparing a polyolefin composition made from or containing a polyolefin, carbon black, and optionally one or more further additives. In more particular, the present disclosure provides a process for continuously preparing a polyolefin composition made from or containing a polyolefin, carbon black, and optionally one or more further additives, wherein the polyolefin is a bimodal or multimodal high density polyethylene.

BACKGROUND OF THE INVENTION

To achieve and maintain certain properties, polyolefins are enhanced with additional substances. These additives can influence the properties of the polyolefins, even when added in small quantities. In some processes, the additives are combined with the polyolefins directly after their polymerization during the pelletizing step.

Bimodal or multimodal polyolefins can be prepared in a cascade of two or more polymerization reactors, which can have different polymerization conditions. The individual particles of the polyolefin powder obtained in such polymerization processes may vary widely in their composition. Accordingly, some processes seek to homogenize these polyolefins in the pelletizing step.

For the preparation of polyolefin compositions made from or containing bimodal or multimodal polyolefins, goals are to ensure that the polymeric components are homogenized and that the plastics additives are uniformly distributed within the polyolefin compositions. This uniformity includes an even homogenization throughout the polymeric material, the ratio of plastics additives to polyolefinic material and the ratio between the different additives for the polyolefin pellets. Furthermore, it is a goal that the homogenization method is reliable and economical.

In particular, it is a goal to distribute homogeneously carbon black in polyolefin compositions. Carbon black can be used for UV protection or as pigment for coloring in many polyolefin applications. Examples of such applications include pipe or plastic fuel tank applications. Carbon black is available as fluffy powder or in pelletized form. Because carbon black can be difficult to handle, some processes use carbon black in the form of polyolefin masterbatches. When using a masterbatch, it is appropriate to ensure that the carrier polymer of the masterbatch and the base polyolefins of the polyolefin composition are compatible. Moreover, preparing the polyolefin masterbatch is an extra process step which increases the production costs for the polyolefin composition.

SUMMARY OF THE INVENTION

In general embodiments, the present disclosure provides a process for continuously preparing a polyolefin pellets of a polyolefin composition made from or containing a polyolefin and carbon black in an extruder device, the process including the steps of
(i) supplying a polyolefin in form of a polyolefin powder at a flow rate to a mixing device;
(ii) (a) measuring the flow rate of the polyolefin powder supplied to the mixing device or
    (b) measuring a flow rate of the polyolefin pellets prepared in the extruder device;
(iii) supplying carbon black at a flow rate to the mixing device;
(iv) optionally supplying one or more further additives at a flow rate to the mixing device;
(v) (a) when measuring the flow rate of the polyolefin powder supplied to the mixing device, adjusting the flow rates of the carbon black and any optional additives in response to the measured flow rate of the polyolefin powder or
    (b) when measuring the flow rate of the polyolefin pellets prepared in the extruder device, adjusting the flow rate of the polyolefin powder to the mixing device in response to the measured flow rate of the polyolefin pellets and either
       (1) keeping the flow rates of the carbon black and any optional additives constant or
       (2) adjusting the flow rates of the carbon black and any optional additives, in response to the measured flow rate of the polyolefin pellets;
(vi) mixing the polyolefin powder, the carbon black and any optional additives to form a powder mixture,
(vii) transferring the powder mixture obtained in step (vi) from the mixing device into the extruder device;
(viii) heating the powder mixture to form a melt and homogenizing the melt within the extruder device to form a polyolefin composition in molten state; and
(ix) pelletizing the molten polyolefin composition, thereby yielding the polyolefin pellets at a flow rate.

In some embodiments, the flow rate of the polyolefin powder is measured.

In some embodiments, a flow rate of the polyolefin pellets prepared in the extruder device is measured.

In some embodiments, the flow rate of the polyolefin powder or the flow rate of the polyolefin pellets is measured by a solids flow meter.

In some embodiments, the mixing device is a paddle mixer including two horizontally orientated counter-rotating shafts.

In some embodiments, the carbon black is supplied to the mixing device from a carbon black storage vessel in a process including the steps of
(iiia) transferring the carbon black from the storage vessel through a first carbon black discharge valve to a carbon black feeding vessel;
(iiib) subsequently transferring the carbon black from the carbon black feeding vessel through a second carbon black discharge valve by gravity to a dosing device; and
(iiic) subsequently transferring the carbon black from the dosing device to the mixing device.

In some embodiments, the first carbon black discharge valve and the second carbon black discharge valve are pinch valves.

In some embodiments, the carbon black feeding vessel is equipped with an agitator.

In some embodiments, the dosing device is equipped with a dosing device hopper and the dosing device hopper is equipped with an agitator.

In some embodiments and in transferring step (iiia), the carbon black passes a conveying chute after having passed the first carbon black discharge valve.

In some embodiments, transferring step (iiia) is carried out intermittently, the carbon black feeding vessel is situated on a scale, and transferring step (iiib) is controlled by measuring changes in the weight of the carbon black feeding vessel.

In some embodiments, the polyolefin is a polyethylene.

In some embodiments, the polyolefin powder is a powder of a bimodal or multimodal polyolefin.

In some embodiments, the polyethylene is a high density polyethylene having a density determined according to ISO 1183 at 23° C. from about 0.945 to about 0.965 g/cm$^3$.

In some embodiments, the process additionally including the steps of (x) supplying a second amount of polyolefin pellets to the extruder device; and (xi) adjusting the flow rate of the second amount of polyolefin pellets fed to the extruder device in response to the measured flow rate of the polyolefin powder or in response to the measured flow rate of the resulting polyolefin pellets.

BRIEF DESCRIPTION OF THE DRAWINGS

While multiple embodiments are disclosed, still other embodiments will become apparent to those skilled in the art from the following detailed description. As will be apparent, certain embodiments, as disclosed herein, are capable of modifications in various obvious aspects, all without departing from the spirit and scope of the claims as presented herein. Accordingly, the drawings and detailed description are to be regarded as illustrative in nature and not restrictive.

The following FIGURE illustrates an embodiment of the subject matter disclosed herein. The claimed subject matter may be understood by reference to the following description taken in conjunction with the accompanying FIGURE, in which like reference numerals identify like elements, and in which:

The FIGURE shows schematically an embodiment of a set-up for preparing a polyolefin composition according to the present disclosure.

DETAILED DESCRIPTION OF THE INVENTION

In a general embodiment, the present disclosure provides a process for preparing a polyolefin composition made from or containing a polyolefin, carbon black, and optionally one or more further additives. In some embodiments, the polyolefins are obtained by polymerizing olefins, alternatively 1-olefins, which are hydrocarbons having terminal double bonds. In some embodiments, monomers are nonpolar olefinic compounds, including aryl-substituted 1-olefins. In some embodiments, 1-olefins are linear or branched $C_2$-$C_{12}$-1-alkenes, including (a) linear $C_2$-$C_{10}$-1-alkenes such as ethylene, propylene, 1-butene, 1-pentene, 1-hexene, 1-heptene, 1-octene, 1-decene and (b) branched $C_2$-$C_{10}$-1-alkenes such as 4-methyl-1-pentene, conjugated and nonconjugated dienes such as 1,3-butadiene, 1,4-hexadiene or 1,7-octadiene or vinylaromatic compounds such as styrene or substituted styrene. In some embodiments, the polyolefin is obtained by polymerizing mixtures of various 1-olefins. In some embodiments, the olefins also include olefins in which the double bond is part of a cyclic structure which can have one or more ring systems. In some embodiments, the cyclic-containing oleins is cyclopentene, norbornene, tetracyclododecene or methylnorbornene or dienes such as 5-ethylidene-2-norbornene, norbornadiene or ethylnorbornadiene. In some embodiments, the polyolefin is obtained by polymerizing mixtures of two or more olefins.

In some embodiments, the process is for preparing polyolefin compositions made from or containing polyolefins which were obtained by homopolymerization or copolymerization of ethylene or propylene. In some embodiments and as comonomers in propylene polymerization, up to 40 about wt. % of ethylene and/or 1-butene is used, based upon the total weight of the final copolymer.

In some embodiments, the process is for preparing a polyolefin composition made from or containing polyolefins obtained by homopolymerizing or copolymerizing ethylene. In some embodiments, the polyolefin compositions is made from or contains polyethylenes in which ethylene is copolymerized with up to about 40 wt. % of $C_3$-$C_8$-1-alkenes, based upon the total weight of the final copolymer. In some embodiments, the $C_3$-$C_8$-1-alkene is 1-butene, 1-pentene, 1-hexene, 1-octene, or mixtures thereof. In some embodiments, the ethylene is copolymerized with up to about 20 wt. % of 1-butene, 1-hexene, or mixtures thereof, based upon the total weight of the final copolymer.

In some embodiments, the process for making the polyolefin includes solution processes, suspension processes, and gas-phase processes. In some embodiments, the process is a suspension polymerization. In other embodiments, the process uses a suspension polymerization with loop reactors or stirred tank reactors. In some embodiments, the process is a gas-phase polymerization. In other embodiments, the process uses gas-phase fluidized-bed reactors or multi-zone circulating gas phase reactors. The polymerization can be carried out batchwise or continuously in one or more stages.

In some embodiments, the process is for preparing polyolefin compositions of many types of common polyolefin polymers. The process can be used for preparing polyolefin compositions made from or containing bimodal or multimodal polyolefins whereby the terms "bimodal" and "multimodal" refer to the modality of the molecular weight distribution. In some embodiments, the polymers can be obtained from polymerizing olefins in a cascade of two or more polymerization reactors under different reaction conditions. Thus, the "modality" indicates how many different polymerization conditions were utilized to prepare the polyolefin, without regard to whether the modality of the molecular weight distribution can be recognized as separated maxima in a gel permeation chromatography (GPC) curve. The term multimodal can include bimodal. In addition to the molecular weight distribution, the polyolefin polymer can have a comonomer distribution. In some embodiments, the average comonomer content of polymer chains with a higher molecular weight is higher than the average comonomer content of polymer chains with a lower molecular weight. In some embodiments, identical or similar reaction conditions in the polymerization reactors of the reaction cascade can be used to prepare narrow molecular weight or monomodal polyolefin polymers. In some embodiments, the resulting multimodal polyolefins may contain individual polyolefin particles of the polyolefin powder that have composition that vary widely.

The polymerization can be carried out using a variety of olefin polymerization catalysts. In some embodiments, the polymerization can be carried out using Phillips catalysts based on chromium oxide, using titanium-based Ziegler- or Ziegler-Natta-catalysts, using single-site catalysts, or using mixtures of such catalysts.

In some embodiments, the polyolefins are obtained as powder that means in the form of small particles. In some embodiments, the particles have a more or less regular morphology and size, depending on the catalyst morphology and size, and on polymerization conditions. Depending on the catalyst used, the particles of the polyolefin powder have a mean diameter of from a few hundred to a few thousand micrometers. In the case of chromium catalysts, the mean particle diameter can be from about 300 to about 1600 μm. In the case of Ziegler type catalysts, the mean particle diameter can be from about 100 to about 3000 μm. In some embodiments, the polyolefin powders have a mean particle diameter of from about 150 to about 250 μm.

In some embodiments, the polyolefins are polyethylenes having an ethylene content of from about 50 to about 100 wt. %, alternatively from about 80 to about 100 wt. %, and alternatively from about 98 to about 100 wt. %, based upon the total weight of the polyethylene. Accordingly, the content of other olefins in the polyethylenes is from about 0 to about 50 wt. %, alternatively from about 0 to about 20 wt. %, and alternatively from about 0 to about 2 wt. %, based upon the total weight of the polyethylene.

In some embodiments, the density of the polyethylene compositions is from about 0.90 g/cm$^3$ to about 0.97 g/cm$^3$. Alternatively, the density is in the range of from about 0.920 to about 0.968 g/cm$^3$ and alternatively in the range of from about 0.945 to about 0.965 g/cm$^3$. The density is determined according to DIN EN ISO 1183-1:2004, Method A (Immersion) with compression molded plaques of 2 mm thickness which were pressed at 180° C., 20 MPa for 8 minutes with subsequent crystallization in boiling water for 30 minutes.

In some embodiments, the melt flow rate MFR$_{21.6}$ at 190° C. under a load of 21.6 kg of the polyethylene compositions, determined according to DIN EN ISO 1133:2005 condition G, is from about 1 g/10 min to about 80 g/10 min, alternatively from about 2 g/10 min to about 50 g/10 min and alternatively from about 5 g/10 min to about 25 g/10 min.

In the general embodiment, the polyolefin is combined with carbon black. In some embodiments, the carbon black is admixed as carbon black powder or in form of pelletized carbon black. In some embodiments, the carbon black is admixed as carbon black powder. In some embodiments, the amount of carbon black in the prepared polyolefin composition is from about 0.1 to about 12 wt. %, alternatively from about 0.5 to about 5 wt. %, alternatively from about 2 to about 3 wt. %, and alternatively from about 2.1 to about 2.5 wt. %.

As used herein, the term "carbon black" designates a family of finely divided carbon pigments produced by incomplete combustion or thermal decomposition of hydrocarbons which have a high surface-area-to-volume ratio. In some embodiments, the carbon black is furnace black or acetylene black. In some embodiments, the carbon black has particle sizes in the range from about 5 nm to about 500 nm, alternatively from about 15 nm to about 60 nm and alternatively of not more than about 25 nm.

In some embodiments, the polyolefin is additionally combined with one or more further additives. In some embodiments, the additives are uniformly distributed within the polyolefin. In some embodiments, the types of additives for preparing polyolefin compositions are antioxidants, light stabilizers, acid scavengers, lubricants, processing aids, antiblocking agents, slip agents, antistatic agents, antifogging agents, pigments or dyes, nucleating agents, flame retardants or fillers. In some embodiments, several additives are added to the polyolefin compositions. The multiple additives can be different types of additives. In some embodiments, several representatives of one type of additive are added to a polyolefin composition. In some embodiments, the additives are described in Hans Zweifel, Plastics Additives Handbook, 5th Edition, Munich, 2001 (incorporated herein by reference).

In some embodiment, the polyolefin in form of a polyolefin powder, the carbon black, and any optional additives are supplied to a mixing device and the combined material is then transferred into the extruder device for melting and further mixing. In some embodiments, the mixing devices are paddle mixers including two horizontally orientated counter-rotating shafts. The shafts are equipped with paddles of an appropriate geometry. The rotating shafts move the composition of polyolefin powder and additives horizontally along the axis of the shafts and at the same time mix the components intensively. Such paddle mixers are commercially available from Kollemann GmbH, Adenau, Germany or J. Engelsmann AG, Ludwigshafen, Germany. The mixture of polyolefin powder and additives exits the mixing device at the end of the shafts and is then transferred to a hopper of the extruder device. In some embodiments, the transfer to the hopper of the extruder device occurs by gravity.

In some embodiments, the polyolefin powder is supplied to the mixing device from a storage vessel, alternatively, from a storage vessel having a conical bottom. In some embodiments, the storage vessel for supplying the polyolefin powder is equipped with a discharging aid which keeps the polyolefin powder in free flowing state. In some embodiments, the discharging aid is the introduction of an inert gas into the bottom to the storage vessel. In some embodiments, the inert gas is nitrogen. In some embodiments, the inert gas is introduced into a conical bottom of the storage vessel. In some embodiments, the polyolefin powder is transferred from the storage vessel to the mixing device by gravity.

In some embodiments, the carbon black is supplied to the mixing device from a dedicated carbon black storage vessel. The carbon black storage vessel can be charged by bag delivery. In some embodiments, the carbon black storage vessel is charged by bulk delivery from container vehicles such as trucks or railcar with pneumatic conveying of the carbon black to the carbon black storage vessel or by filling from semi-bulk containers such as big bags. In some embodiments, a gas is introduced into the bottom of the carbon black storage vessel, alternatively into a conical bottom of the carbon black storage vessel and alternatively into a conical bottom which is covered by a synthetic cloth. In some embodiments, the gas is dried air or nitrogen. In some embodiments, a combination of two carbon black storage vessels is employed, allowing that one carbon black storage vessel is in operation for supplying carbon black to the mixing device while the other can be refilled. In some embodiments, each of the carbon black storage vessels has a dimension that permits holding a quantity of carbon black which is sufficient for the process to be carried out for about 4 days.

In some embodiments, the process for supplying the carbon black from the storage vessel to the mixing device includes the transferring step (iiia) for transferring the carbon black from the storage vessel through a first carbon black discharge valve to a carbon black feeding vessel; the transferring step (iiib) for subsequently transferring the carbon black from the carbon black feeding vessel through a second carbon black discharge valve by gravity to a dosing device; and the transferring step (iiic) for subsequently transferring the carbon black from the dosing device to the mixing device.

In some embodiments, the first carbon black discharge valve and the second carbon black discharge valve are pinch valves.

In some embodiments, conveying of the carbon black in transferring steps (iiia), (iiib), and (iiic) occurs in downpipes, alternatively in downpipes of flexible consistency.

In some embodiments, the transferring step (iiia) provides that the carbon black passes a conveying chute after having passed the first carbon black discharge valve. In further embodiments, the conveying chute is operated by introducing a gas into the bottom of the conveying chute, alternatively into two or more inlets which are evenly distributed over the length of the conveying chute. In some embodiments, the gas is dried air or nitrogen.

In some embodiments, the carbon black feeding vessel has a smaller volume than the carbon black storage vessel and decreases the height difference between (a) the carbon black storage vessel or (b) the conveying chute and the dosing device. In some embodiments, the carbon black feeding vessel is on a scale. In some embodiments, the carbon black feeding vessel is equipped with an agitator, alternatively a spiral agitator. In some embodiments, the agitator extends to the outlet of the carbon black feeding vessel.

In some embodiments wherein the carbon black feeding vessel is situated on a scale, transferring step (iiia) is carried out intermittently, and transferring step (iiib) is controlled by measuring changes in the weight of the carbon black feeding vessel. In some embodiments, the transferring step (iiib) occurs intermittently and is carried out at a different point of time than transferring step (iiia).

In some embodiments, the dosing device is equipped with a dosing device hopper and the dosing device hopper is equipped with an agitator. In some embodiments, the dosing device hopper is equipped on top with a filter unit which allows compensation for the pressure built up when carrying out transferring step (iiib) by venting gas through the filter to atmosphere. In some embodiments, the filter unit includes a cleaning device to prevent clogging by carbon black.

In some embodiments, the optional additives are supplied from dedicated storage vessels for the additives. In other embodiments, the additives are supplied directly from transport containers such as big bags. The additives can be supplied in solid form, liquid, or dissolved form. In some embodiments, when the additives are supplied in solid form, the additives are in the form of small particles. In some embodiments, the additives are supplied individually, in one or more mixtures made from or containing selected additives, or as a mixture of the additives. In some embodiments, the additives are supplied in the form of solid particles.

In some embodiments, the polyolefin compositions are made from or contain a polyolefin, carbon black and optionally one or more additives. In some embodiments, the polyolefin compositions are is made from a recipe which identifies the nature of the employed polyolefin powder, the nature of the employed carbon black, the nature of the optional additives, their number, their quantity and their ratio. The polyolefin compositions are made from or contain primarily the polyolefin. In some embodiments, the polyolefin portion is from about 80 to about 99.98 wt. %, alternatively from about 95 to about 99.95 wt. %, and alternatively from about 98 to about 99.9 wt. %, based upon the total weigh of the polyolefin composition.

In some embodiments, the amount of polyolefin powder supplied to the mixing device is regulated by a feeding device. In some embodiments, the feeding device is a rotary valve or a screwfeeder. By varying the speed of the feeding device, the amount of polyolefin powder supplied to the mixing device can be altered. In some embodiments, the speed of the feeding device is controlled by a controller in a way that the fed amount of polyolefin powder corresponds to a preselected set-point corresponding to the selected amount of the polyolefin in the polyolefin composition.

In some embodiments, the ratio of carbon black and any optional additives to polyolefin in the polyolefin composition is kept constant by adjusting the flow rates of carbon black and any optional additives. In some embodiments, the ratio is maintained with high flow rates of polyolefin powder. By using the amount of polyolefin powder supplied to the extruder for calculating these set points for the carbon black and any optional additives, small variations in the speed of the polyolefin powder feeding device are instantaneously compensated by corresponding modifications in the flow rates of the additives. This process of adjustment can be contrasted with solely using set points derived from the recipe of the polyolefin composition for regulating the flow rates of the additives. Accordingly the amount of polyolefin powder supplied to the mixing device is continuously measured. This occurs by continuously determining the flow rate of the polyolefin powder.

In some embodiments, the flow rate of the polyolefin pellets prepared in the extruder device is measured and the flow rate of the polyolefin powder to the mixing device is adjusted based on the amount of polyolefin pellets produced in the extruder device. By using a measurement of the flow rate of the resulting polymer pellets for adjusting the flow rate of the polyolefin powder, difficulties in measuring polymer flow rates of polymer particles having a certain stickiness are reduced. In some embodiments, the flow rate of the polyolefin pellets is measured on dried polyolefin pellets. Alternatively, the flow rate is measured downstream of an underwater pelletizer and a centrifugal drier. In this embodiment, the flow rates of the carbon black and any optional additives are either kept constant at a pre-determined value and the ratio of carbon black and any optional additives to polyolefin in the polyolefin composition is controlled by solely adjusting the flow rate of the polyolefin powder supplied to the mixing device or both the flow rate of the polyolefin powder and the flow rates of the carbon black and any optional additives are adjusted based on the amount of polyolefin pellets produced in the extruder device, alternatively employing different control characteristics for controlling the flow rates of the carbon black and any optional additives and for controlling the feed of polyolefin powder.

In some embodiments, the flow rate of the polyolefin powder supplied to the mixing device or the flow rate of the polyolefin pellets prepared in the extruder device are measured by a solids flow meter. In some embodiments, solids flow meters can use impact plate, measuring chute or Coriolis measuring technologies. Such solids flow meters are commercially available from Schenck Process, Whitewater, Wis., USA or Coperion K-Tron, Gelnhausen, Germany. In some embodiments, the solids flow meter is equipped with a controller. This controller allows adjusting the speed of the feeding device, which supplies the polyolefin powder to the extruder, based on information regarding the supplied amount of polyolefin powder.

The measured flow rate of the polyolefin powder supplied to the mixing device or the measured flow rate of the polyolefin pellets can be used to adjust the flow rates of the carbon black and any optional additives. In some embodiments, the controller of the solid flow meter transmits a signal, which indicates the flow rate of the polyolefin powder to the mixing device to a computing device such as a computer. The computing device continuously calculates set points for selected flow rates of additives to the mixing device which set points reflect the amounts of polyolefin powder actually supplied to the extruder device.

In some embodiments, the process for preparing a polyolefin composition further includes the step of supplying an amount of polyolefin pellets to the extruder device. This option permits further adding pelletized polymer material to the polyolefin composition. In some embodiments, these pelletized polymer materials are added in amounts smaller than the polyolefin powder. In some embodiments, the pelletized polymer material is previously produced polyolefin compositions, which do not comply with specified property requirements, or transition materials, which were obtained in a polymerization while transitioning from one polyolefin grade to another. In some embodiments, the polyolefin pellets are supplied to the same hopper as the mixture of polyolefin powder, carbon black and the optionally supplied additives. In some embodiments, the flow rate of the polyolefin pellets to the hopper is adjusted based on the measured flow rate of the polyolefin powder supplied to the mixing device or based on the measured flow rate of the polyolefin pellets. The computing device then continuously calculates a set point for selected flow rates of polyolefin pellets to the hopper.

In some embodiments, the powder mixture of polyolefin powder, carbon black and the optionally supplied additives obtained in the mixing device is transferred from the mixing device into the extruder device. In some embodiments, the extruder device is equipped with at least one hopper for receiving this powder mixture. The material is then transferred from the hopper into the extruder device. The extruder device can however also be equipped with one or more additional hoppers for feeding additional materials to the extruder device. The extruder device serves for melting the polyolefin powder and so forming a polyolefin composition in a molten state, homogenizing the molten polyolefin composition and uniformly distributing the carbon black and the optional one or more additives therein. The molten polyolefin composition is thereafter passed to a pelletizing unit and there transformed into pellets.

In some embodiments, the extruder devices are extruders or continuous mixers. These extruders or mixers can be single- or two-stage machines which melt and homogenize the polyethylene composition. In some embodiments, the extruders are pin-type extruders, planetary extruders or co-rotating disk processors. In some embodiments, the extruders are combinations of mixers with discharge screws and/or gear pumps. In some embodiments, the extruders are screw extruders, alternatively a twin-screw machine. In some embodiments, the extruder devices are twin-screw extruders and continuous mixers with discharge elements. In other embodiments, the extruder devices are continuous mixers with counter rotating and intermeshing double screws or the extruder device includes at least one co-rotating double screw extruder. Machinery of this type is manufactured by Coperion GmbH, Stuttgart, Germany; KraussMaffei Berstorff GmbH, Hannover, Germany; The Japan Steel Works LTD., Tokyo, Japan; Farrel Corporation, Ansonia, USA; or Kobe Steel, Ltd., Kobe, Japan. In some embodiments, the extruder devices are further equipped with units for pelletizing the melt, such as underwater pelletizers.

The FIGURE shows schematically an embodiment of a set-up for preparing a polyolefin composition.

Polyolefin powder is provided via line (1) to a polyolefin powder storage vessel (2). Nitrogen is introduced into storage vessel (2) from the bottom via line (3). The polyolefin powder is supplied via line (4) to rotary valve (5) which is operated by a motor M. The polyolefin powder is then further transferred by gravity via line (6) to mixing device (25). In some embodiments, mixing device (25) is a paddle mixer including two horizontally orientated counter-rotating shafts. As the polyolefin powder is transferred from rotary valve (5) to mixing device (25), the polyolefin powder passes a solid flow meter (9) which measures the flow rate of the polyolefin powder to mixing device (25), that is, the amount of polyolefin powder delivered to mixing device (25) per time unit. Solid flow meter (9) is equipped with a controller (10). Controller (10) sends a signal (11) to motor M of rotary valve (5) for adjusting the flow rate of the polyolefin powder if the flow rate measured by solid flow meter (9) differs from the targeted set point of the flow rate previously implemented in controller (10). Controller (10) also sends a signal (12), which indicates the flow rate of polyolefin powder from storage vessel (2) to mixing device (25), to a computing device (13).

Carbon black is provided via line (31) to a carbon black storage vessel (32). Nitrogen is introduced into carbon black storage vessel (32) from the bottom via line (33). The carbon black is supplied via line (34) to pinch valve (35). The carbon black is then further transferred by gravity via line (36) to conveying chute (37). For transporting the carbon black within the conveying chute (37), nitrogen is introduced into conveying chute (37) via line (38). The carbon black is then transferred via line (39) to carbon black feeding vessel (40), which is equipped with agitator (41). For determining changes in the carbon clack filling level, the carbon black feeding vessel (40) is on scale (42). From carbon black feeding vessel (40), the carbon black is supplied via line (43) to pinch valve (44) and then further transferred by gravity via line (45) to dosing device hopper (46) of dosing device (47). Dosing device hopper (46) is operated by a motor M and equipped with agitator (48).

Dosing device (46) can weigh the amount of carbon black dosed into line (49) through which the carbon black is supplied to mixing device (25). Dosing device (46) is equipped with a controller (50). Controller (50) receive a signal which indicates the amount of carbon black dosed by dosing device (47) into line (49). The set point of the amount of carbon black to be dosed is continuously calculated by computing device (13) based on signal (12), which indicates the flow rate of polyolefin powder from storage vessel (2) to mixing device (25), and is based on a recipe for the polyolefin composition which recipe was previously entered into the computing device (13).

The FIGURE further shows a dosing device (15) for feeding additives in particulate form to mixing device (25). In another embodiment, the process can use two or three or more of these additive feeding units. In each unit, an additive or an additive mixture is provided via a line (14) to a dosing device (15) being operated by a motor M. Dosing devices (15) can weigh the amount of the additive or additive mixture dosed into lines (16) through which the additives are supplied to mixing device (25). Each dosing device (15) is equipped with a controller (17). Controllers (17) receive signals which indicate the amounts of additive dosed by respective dosing devices (15) into respective lines (16). The set points for the amounts of additives to be dosed are continuously calculated by computing device (13) based on signal (12), which indicates the flow rate of polyolefin powder from storage vessel (2) to mixing device (25), and is based on a recipe for the polyolefin composition which recipe was previously entered into the computing device (13).

The mixture of polyolefin powder, carbon black and additives prepared in mixing device (25) is transferred from mixing device (25) by gravity via line (26) to hopper (7) of extruder device (8) which is also operated by a motor M. By varying the speed of motor M of rotary valve (5), the flow rate of the polyolefin powder supplied to mixing device (25) can be adjusted. The combination of polyolefin powder, carbon black and additives is then transferred into the extruder device (8) and therein melted and homogenized. The melt is conveyed within extruder device (8) to pelletizing unit (18) from which the pelletized polyolefin composition is withdrawn via line (19).

The set-up shown in the FIGURE further includes a unit for supplying polymer pellets to hopper (7). This unit has a pellet storage vessel (20), to which polymer pellets are provided via line (21). The polyolefin pellets are supplied via line (22) to rotary valve (23) which is operated by a motor M. The polyolefin pellets are then further transferred via line (24) to hopper (7) of extruder device (8). The amount of polyolefin pellets supplied to hopper (7) is given by the speed of motor M of rotary valve (23), which speed is set by computing device (13) based on signal (12), which indicates the flow rate of polyolefin powder from storage vessel (2) to hopper (7), and is based on the recipe for the polyolefin composition which was previously entered into the computing device (13).

The invention claimed is:

1. A process for continuously preparing polyolefin pellets of a polyolefin composition in an extruder comprising:
   (i) supplying a polyolefin in form of a polyolefin powder at a flow rate to a mixing device;
   (ii) measuring a flow rate of the polyolefin pellets prepared in the extruder device;
   (iii) supplying carbon black powder at a flow rate to the mixing device;
   (iv) optionally supplying one or more further additives at a flow rate to the mixing device;
   (v) adjusting the flow rate of the polyolefin powder to the mixing device in response to the measured flow rate of the polyolefin pellets and either
      (1) keeping the flow rates of the carbon black powder and any optional additives constant or
      (2) adjusting the flow rates of the carbon black powder and any optional additives,
      in response to the measured flow rate of the polyolefin pellets;
   (vi) mixing the polyolefin powder, the carbon black powder and any optional additives to form a powder mixture,
   (vii) transferring the powder mixture obtained in step (vi) from the mixing device into the extruder device;
   (viii) heating the powder mixture to form a melt and homogenizing the melt within the extruder device to form a polyolefin composition in a molten state; and
   (ix) pelletizing the molten polyolefin composition, thereby yielding the polyolefin pellets at a flow rate.

2. The process of claim 1, wherein the flow rate of the polyolefin powder is measured.

3. The process of claim 1, wherein the flow rate of the polyolefin powder or the flow rate of the polyolefin pellets is measured by a solids flow meter.

4. The process of claim 1, wherein the mixing device is a paddle mixer having two horizontally orientated counter-rotating shafts.

5. The process of claim 1, wherein the carbon black powder is supplied to the mixing device from a carbon black storage vessel in a process comprising
   (iiia) transferring the carbon black powder from the storage vessel through a first carbon black discharge valve to a carbon black feeding vessel;
   (iiib) subsequently transferring the carbon black powder from the carbon black feeding vessel through a second carbon black discharge valve by gravity to a dosing device; and
   (iiic) subsequently transferring the carbon black powder from the dosing device to the mixing device.

6. The process of claim 5, wherein the first carbon black discharge valve and the second carbon black discharge valve are pinch valves.

7. The process of claim 5, wherein the carbon black feeding vessel is equipped with an agitator.

8. The process of claim 5, wherein the dosing device is equipped with a dosing device hopper and the dosing device hopper is equipped with an agitator.

9. The process of claim 5, wherein in transferring step (iiia), the carbon black powder passes a conveying chute after having passed the first carbon black discharge valve.

10. The process of claim 5, wherein transferring step (iiia) is carried out intermittently, the carbon black feeding vessel is on a scale, and transferring step (iiib) is controlled by measuring changes in the weight of the carbon black feeding vessel.

11. The process of claim 1, wherein the polyolefin is a polyethylene.

12. The process of claim 1, wherein the polyolefin powder is a powder of a bimodal or multimodal polyolefin.

13. The process of claim 11, wherein the polyethylene is a high density polyethylene having a density determined according to ISO 1183 at 23° C. from about 0.945 to about 0.965 g/cm$^3$.

14. The process of claim 1, further comprising the steps of:
   (x) supplying an amount of polyolefin pellets to the extruder device; and
   (xi) adjusting the flow rate of the amount of polyolefin pellets fed to the extruder device in response to the measured flow rate of the polyolefin pellets prepared in the extruder device.

15. A process for continuously preparing a polyolefin composition comprising polyolefin and carbon black in an extruder device, the process comprising the steps
   (i) supplying polyolefin in form of a polyolefin powder to a mixing device;
   (ii) measuring a flow rate of the polyolefin pellets prepared in the extruder device;
   (iiia) transferring carbon black powder from a storage vessel through a first carbon black discharge valve to a carbon black feeding vessel;
   (iiib) subsequently transferring the carbon black powder from the carbon black feeding vessel through a second carbon black discharge valve by gravity to a dosing device; and
   (iiic) subsequently transferring the carbon black powder from the dosing device to the mixing device;
   (iv) optionally supplying one or more further additives to the mixing device;
   (v) adjusting the flow rate of the polyolefin powder to the mixing device in response to the measured flow rate of the polyolefin pellets and either keeping the flow rates of the carbon black powder and the optionally supplied one or more further additives supplied to the mixing device constant or also adjusting the flow rates of the carbon black powder and the optionally supplied one or more further additives supplied to the mixing device in response to the measured flow rate of the polyolefin pellets;

(vi) mixing the polyolefin powder, the carbon black powder and the optionally supplied one or more further additives to form a powder mixture, (vii) transferring the powder mixture obtained in step (vi) from the mixing device into the extruder device;

(viii) heating the powder mixture to form a melt and homogenizing the melt within the extruder device to form a polyolefin composition in liquid state; and (ix) pelletizing the polyolefin composition.

16. The process of claim 15, wherein, in transferring step (iiia), the carbon black powder passes a conveying chute after having passed the first carbon black discharge valve.

17. The process of claim 15, wherein transferring step (iiia) is carried out intermittently, the carbon black feeding vessel is situated on a scale and transferring step (iiib) is controlled by measuring differences in the weight of the carbon black feeding vessel.

18. The process of claim 15, wherein the polyolefin is a polyethylene.

19. A process for continuously preparing a polyolefin composition comprising polyolefin and carbon black in an extruder device, the process comprising the steps (i) supplying polyolefin in form of a polyolefin powder to a mixing device;

(ii) measuring a flow rate of the polyolefin pellets prepared in the extruder device;

(iii) supplying carbon black powder to the mixing device;

(iv) optionally supplying one or more further additives to the mixing device;

(v) adjusting the flow rate of the polyolefin powder to the mixing device in response to the measured flow rate of the polyolefin pellets and either keeping the flow rates of the carbon black powder and the optionally supplied one or more further additives supplied to the mixing device constant or also adjusting the flow rates of the carbon black powder and the optionally supplied one or more further additives supplied to the mixing device in response to the measured flow rate of the polyolefin pellets;

(vi) mixing the polyolefin powder, the carbon black and the optionally supplied one or more further additives to form a powder mixture, (vii) transferring the powder mixture obtained in step (vi) from the mixing device into the extruder device;

(viii) heating the powder mixture to form a melt and homogenizing the melt within the extruder device to form a polyolefin composition in liquid state;

(ix) pelletizing the polyolefin composition;

(x) supplying polyolefin pellets to the extruder device; and (xi) adjusting the flow rate of the polyolefin pellets fed to extruder device in response to the measured flow rate of prepared in the extruder device.

* * * * *

UNITED STATES PATENT AND TRADEMARK OFFICE
CERTIFICATE OF CORRECTION

PATENT NO. : 11,104,036 B2
APPLICATION NO. : 16/423829
DATED : August 31, 2021
INVENTOR(S) : Kruempel et al.

Page 1 of 1

It is certified that error appears in the above-identified patent and that said Letters Patent is hereby corrected as shown below:

On the Title Page

Column 1, Item (30), Line 1, delete "14196371" and insert -- 14196371.0 --, therefor In the Claims In Column 14, Claim 19, Line 29, after "of" insert -- the polyolefin pellets --

Signed and Sealed this
Twenty-fourth Day of January, 2023

Katherine Kelly Vidal
*Director of the United States Patent and Trademark Office*